(12) United States Patent
Paul et al.

(10) Patent No.: US 7,109,263 B2
(45) Date of Patent: Sep. 19, 2006

(54) LABELING ADHESIVE

(75) Inventors: Charles W. Paul, Madison, NJ (US); Mitchell Blumenthal, Belle Mead, NJ (US); Line Willis, Farnham (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/428,890

(22) Filed: May 2, 2003

(65) Prior Publication Data

US 2004/0220308 A1 Nov. 4, 2004

(51) Int. Cl.
*C06L 93/04* (2006.01)

(52) U.S. Cl. .................. 524/271; 524/321; 524/322

(58) Field of Classification Search ........ 524/321–322, 524/271
See application file for complete search history.

(56) References Cited

U.S. PATENT DOCUMENTS

| 3,950,291 | A | * | 4/1976 | Jurrens | ....................... 524/273 |
| 5,143,961 | A | * | 9/1992 | Scholl et al. | ............... 524/317 |
| 6,653,522 | B1 | * | 11/2003 | Blumenthal et al. | ........ 604/361 |

* cited by examiner

*Primary Examiner*—Peter Szekely
(74) *Attorney, Agent, or Firm*—Cynthia L. Foulke

(57) ABSTRACT

The use of dimer acids with conventional hot melt adhesive polymers provide adhesives particularly useful for bottle labeling. The label, along with the adhesive, can be easily removed from the bottle during the recycling process.

14 Claims, No Drawings

LABELING ADHESIVE

FIELD OF THE INVENTION

The invention relates to the field of adhesives. More specifically the invention relates to hot melt adhesives and the use thereof in removable labeling applications.

BACKGROUND OF THE INVENTION

Both natural polymers and synthetic polymers have been used as base polymers in bottle labeling adhesive applications. Natural polymer-based adhesives, such as starch- and casein-based adhesives, can be formulated to offer such advantages as good machinability, high wet strength, and ice water resistance. Synthetic emulsion polymer-based adhesives provide advantages such as, for example, a fast set time. Hot melt adhesives based on styrenic block copolymers are able to produce especially soft, often pressure sensitive adhesives, which are particularly effective in bonding plastic labeling films to plastic bottles. The increased use of plastic labels and bottles has lead to the growth of hot melt adhesive technology. One disadvantage of hot melt adhesives is that they are hydrophobic and thus difficult to remove from the bottle after use in typical recycling operations.

A need continues to exist in the art for a hot melt adhesive that is useful in bottle labeling applications and which is removable with the label from off a glass or plastic bottle. The current invention addresses this need.

SUMMARY OF THE INVENTION

The invention provides a labeled container, such as a bottle or jar, wherein the label is attached to the container using a hot melt adhesive comprising an acid-functional diluent, preferably a dimer acid. The label can be easily removed from the container during the recycling process by application of alkaline water. The invention provides the art with a method of recycling a labeled bottle, jar or like container whereby the label is easily removed from the container without leaving any adhesive residue on the bottle.

One aspect of the invention is directed to a hot melt adhesive formulation that is particularly advantageous for use in bottle labeling applications. The adhesive of the invention comprises an acid functional diluent, a styrenic block copolymer and a tackifier. In one embodiment the adhesive also comprises a plasticizer.

Another aspect of the invention is directed to a method for bonding a first substrate to a second substrate comprising applying to a surface of at least one of said first and/or second substrate the adhesive composition of the invention. Preferably, the first substrate is a label and said second substrate is a container. Particularly preferred for use in the method of the invention are plastic and glass containers, such as jars, bottles and the like.

Still another aspect of the invention is directed to an article comprising a label, wherein the label is attached to the article by the adhesive described herein. In one embodiment of the article of the invention is a glass or plastic article comprising a paper or plastic label.

Yet another aspect of the invention is a method of removing a label from a container, the method comprising contacting a labeled container with alkaline water.

DETAILED DESCRIPTION OF THE INVENTION

The invention provides an adhesive, a method for bonding a first substrate to a second substrate, articles manufactured using the adhesive of the invention, in particular labeled bottles and jars and a method of removing a label from a bottle or jar.

The invention provides the labeling industry with new kinds of recyclable labeling adhesives useful for applying labels onto glass or plastic containers. The adhesive has strong tack to hold the label on the glass or plastic substrate and satisfactorily secures the plastic label to the glass within a short time. Moreover, the adhesive of the invention may be applied using conventional high-speed labelers such as pallet transfer rotary labelers of the type manufactured by Krones, Ltd. or Trine Labeling Systems.

Acid functional diluents have a carboxylic acid group and exhibit an acid number greater than 100, preferably greater than 150, and most preferably about 200. Included in this group are fatty acids and their hydrogenated derivatives such as oleic acid, linoleic acid, and isostearic acid. Acid functionalization can be obtained on various diluents by free radical grafting of maleic anhydride. Alternatively vinyl monomers can be copolymerized with acid functional monomers. Examples are the copolymerization of ethylene or styrene with maleic anhydride or ethylene with acrylic acid. These acid functional diluents can be liquids or waxy solids, but most preferably are liquids for speed of reaction in aqueous base. Most preferred are liquid diluents with more than one acid site per molecule and with a molecular weight above 250 g/mol. Higher molecular weights minimize volatility in the hot melt tank. Most preferred are "dimer acids" with a molecular weight of about 500 and an acid number of from about 190 to about 200.

"Dimer acids" are polymeric fatty acids which are derived from unsaturated fatty acids, typically $C_{18}$ acids such as oleic, linoleic and linolenic acid. Because of their ready availability and relative ease of polymerization, oleic and linoleic acids are the preferred starting materials for the preparation of the polymeric fatty acid resins used herein. Mixtures of these two acids are found in tall oil fatty acids and, accordingly, commercial tall oil fatty acids are a common source for preparing the described polymeric fatty acid resins. Representative of polymeric fatty acids are those commercially available from the polymerization of tall oil fatty acids. The polymeric fatty acids used herein, sometimes referred to in the art as "dimer acids", are complex mixtures resulting from the polymerization of fatty acids. The composition of these polymeric fatty acids are typically 0–5% by weight $C_{18}$ monobasic acids (monomer), 60–95% by weight $C_{36}$ dibasic acids (dimer) and 1–35% by weight $C_{54}$ and higher polybasic acids (trimer).

These polymeric multiacids are prepared by self condensation of unsaturated fatty acids to produce "dimer" acids. However, the dimerization process typically produces up to about 25% of triacid as well. The relative ratios of monomer, dimer, and trimer in unfractionated polymeric fatty acids are dependent on the nature of the starting material and the conditions of polymerization. For purposes of this invention the term dimer acid is meant to include small amounts of trimer acid. The preparation of these dimer acids is further described in Encyclopedia of Chemical Technology, "Dimer Acids", E. Leonard, 3 ed., vol. 7, p. 768, Wiley (1979). Methods for the polymerization of fatty acids are described, for example, in U.S. Pat. No. 3,157,681. The polymeric fatty acids may be unhydrogenated or hydrogenated. A particularly suitable acid functional diluent is Pripol 1013 dimer acid, which has an acid number of 196 and is available from Uniqema.

Various tackifiers are suitable for use in the invention. These include hydrocarbon resins, synthetic polyterpenes, rosin esters, natural terpenes, rosin, and the like as are well known to those skilled in the art (see C. W. Paul, "Hot Melt Adhesives", in Adhesion Science and Engineering, volume 2, *Surfaces. Chemistry & Applications*, M. Chaudhury and A, V. Pocius editors, Elsevier, N.Y., 2002, p. 711). Preferred are acid functional tackifiers such as rosin, hydrogenated rosin, and maleated rosin, with and acid number above 100. Most preferred is hydrogenated rosin. One such material is Foral AX, which is hydrogenated wood rosin and has an acid number of 130; it is available from Hercules. The tackifying agent will generally be present at a level of from about 35 to about 75% by weight of the adhesive composition and preferably at a level of at least about 45% by weight.

In one embodiment, the adhesive comprises from about 10% to about 35 wt % of a dimer acid, from about 10 to about 30 wt % of a styrenic block copolymer, and from about 35 to about 75 wt % of a rosin tackifier.

The invention also provides a process for bonding a substrate to a similar or dissimilar substrate using the adhesive. The process comprises applying to at least a portion of at least a first substrate a molten hot melt, bringing a second substrate in contact with the adhesive present on the first substrate, and allowing the adhesive to solidify, whereby the first substrate is bonded to the second substrate.

The invention further provides articles of manufacture comprising the adhesive. The properties of the adhesive makes it particularly useful as a labeling adhesive.

The adhesives of the invention may be formulated for application at low temperatures, i.e., formulations that can be applied at temperatures below about 160° C., preferable below about 140° C., and most preferably below about 120° C.

The polymers used to prepare the adhesive of the invention are based on rubbery block copolymers. These polymers include the block or multi-block copolymers having the general configuration: A-B-A or A-B-A-B-A-B- wherein the polymer blocks A are non-elastomeric polymer blocks which, as homopolymers have glass transition temperatures above 20° C., while the elastomeric polymer blocks B are butadiene or isoprene or butadiene and isoprene which is partially or substantially hydrogenated. Both linear and/or branched may be used in the practice of the invention. Typical branched structures contain an elastomeric portion with at least three branches that can radiate out from a central hub or can be otherwise coupled together.

The non-elastomeric blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric polymer blocks may be derived from alpha olefins, alkylene oxides, acetals, urethanes, etc.

The elastomeric block component of the copolymer may be isoprene or butadiene that may or may not be hydrogenated. This hydrogenation may be either partial or substantially complete. Selected conditions may be employed for example to hydrogenate the elastomeric block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete.

Typical of the rubbery block copolymers useful herein are the polystyrene-polybutadiene-polystyrene (SBS), polystyrene-polyisoprene-polystyrene (SIS) and e.g., polystyrene-poly-(ethylenebutylene)-polystyrene (SEBS) and polystyrene-poly-(ethylenepropylene)-polystyrene (SEPS). These copolymers may be prepared using methods taught, for example, in U.S. Pat. Nos. 3,239,478; 3,427,269; 3,700,633; 3,753,936; and 3,932,327. Alternatively, they may be obtained from Kraton Polymers under the trademarks Kraton 1101, 1102, 1107, 1650, 1652 and 1657; from Enichem under the Europrene Sol-T tradenames; from Firestone under the tradename Stereon 840A, and from Dexco Polymers under the tradename Vector. Mixtures of copolymers, such as blends of SBS and SIS, may also be used. To minimize viscosity and maximize processibility on labeling machines the melt index of the base polymers (grams/ 10 minutes at 200° C./5 kg-ASTM D-1238 (Condition G)) is preferably above 5 and most preferably above 20.

The block copolymer component will generally be present at a level of from about 10 to about 30% by weight of the adhesive composition, more typically at levels of about 14% to about 22%.

The present invention optionally also includes 0 to about 20 weight percent of an endblock resin which is substantially aromatic. Examples of such endblock resins can be prepared from any substantially aromatic monomers having a polymerizable unsaturated group. Typical examples of such aromatic monomers include the styrenic monomers, styrene, alphamethyl styrene, vinyl toluene, methoxy styrene, tertiary butyl styrene, chlorostyrene, etc., coumarone, indene monomers including indene, and methyl indene. The aromatic endblock resin is preferably present in amounts of 5 to 20 weight percent. Preferred is HERCOLITE 240 or KRISTALEX 5140, both of which are alpha methyl styrene resins available from Hercules, Inc.

The present invention also optionally includes 0 to about 20 weight percent of a plasticizer. These plasticizers include materials which are liquid diluents, but do not have a high acid functionality (i.e. acid number is <100). Such liquid diluents include plasticizing or extending oils or liquid tackifiers, including olefin oligomers and low molecular weight polymers as well as vegetable and animal oil and their derivatives. The petroleum derived oils which may be employed are relatively high boiling materials containing only a minor proportion of aromatic hydrocarbons (preferably less than 30%, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Preferred are LUMINOL T350, a mineral oil available from Petrocanada and KAYDOL OIL available from Witco Corporation.

Other plasticizers include phthalates such as dioctyl phthalate, polyesters such as Paraplex G-59 available from C. P. Hall Company, adipates such as dioctyl adipate, epoxidized soybean oil, trimellitates, such as triisooctyl trimellitate, sulfonamides such as N-octyl para-toluene sulfonamide, citrates such as triethyl citrate, phosphate esters such as 2-ethyl hexyl diphenyl phosphate, and benzoates such as diethylene glycol dibenzoate, and the like. Preferred plasticizers are those with some level of water sensitivity by virtue of their polarity. For example materials containing ether, hydroxy, ester, phosphate, ester, sulfonamide, and phosphate groups. Most preferred are polyalkylene glycol benzoates such as Benzoflex 2088 which is a dibenzoate derived from a mixture of polyalkylene glycols (diethylene glycol, trietheylene glycol, and dipropylene glycol) and is available from Velsicol Chemical Corp.

An antioxidant or stabilizer may also be included in the adhesive compositions described herein in amounts of up to about 3% by weight, more typically in amounts of about 0.5%. Among the stabilizers or antioxidants useful herein are the hindered phenols or hindered phenols in combination with a secondary antioxidant such as distearyl thiodipropionate ("DSTDP") or dilauryl thio-dipropionate ("DLTDP"). Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl) propionate; pentaerythritol tetrakis (3-lauryl thiodipropionate); n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. Preferred are IRGAFOS 168, a secondary antioxidant available from Ciba and IRGANOX 1010, a hindered phenol primary antioxidant available from Ciba-Geigy. Other antioxidants include ETHANOX 330, a hindered phenol from Albermarle; SANTOVAR, a 2,5 ditert-amyl hydroquinone from Monsanto; and NAVA-GARD P a tris (p-nonylphenyl)phosphite from Uniroyal.

Other additives conventionally used in hot melt adhesives to satisfy different properties and meet specific application requirements also may be added to the adhesive composition of this invention. Such additives include, for example, fillers, pigments, flow modifiers, dyestuffs, which may be incorporated in minor or larger amounts into the adhesive formulation, depending on the purpose.

Hot melt adhesives may be prepared using techniques known in the art. Typically, the adhesive compositions are prepared by blending the components in the melt at a temperature of about 100° to 200° C. until a homogeneous blend is obtained, generally about two hours. Various methods of blending are known and any method that produces a homogeneous blend is satisfactory.

The properties of the invention make it particularly useful in, e.g., in bottle labeling or other applications involving plastic bonding.

The adhesive is applied to a substrate while in its molten state and cooled to harden the adhesive layer. The adhesive product can be applied to a substrate such a plastic or glass article by a variety of methods including coating or spraying in an amount sufficient to cause the article to adhere to another substrate or an unrelated material such as a low density polyolefin or other conventionally employed substrates.

While the adhesive finds particular use as a labeling adhesive, other uses are clearly contemplated and are encompassed by the invention. The adhesive described herein may be used for, e.g., laminating.

As used herein, a "container" means a jar, bottle, can or canister, bucket, beaker and the like. The container may be made of glass, plastic or metal. Specific examples include, but are not limited to soft drink bottles, beer bottles, wine bottles, salad dressing bottles, sauce jars, condiment jars, and the like. The container may be made of any type of material including but not limited to wood, glass, metal, plastic or poly and plastic-coated glass.

As used herein and a "label" means e.g. a material having a surface to which an adhesive is applied. The label may be made of any type of material, including but not limited to paper, plastic or metallized paper and the like. Labels may be of any size or shape. While the label may be opaque, use of plastic labels wherein at least a portion is transparent is comtemplated. By "transparent" means that at least a portion of the label is substantially clear, i.e., the surface of the substrate to which the label has been applied is visible through the label and adhesive.

Use of the adhesives of the invention to bond labels to glass or plastic substrates is particularly advantageous.

Plastic as used herein refers to the material used to make e.g., food and other storage containers and/or labels include polyethylene, polypropylene, polystyrene, polycarbonate, polyvinylchloride, high density polyethylene (HDPE) and polyethylene terephthalate (PET).

To attach the labels to the article, the adhesive is applied to the surface of the container or, when using a high speed labeler, directly to the label. The label and the article are then contacted under pressure and the adhesive bond allowed to set. The amount of pressure and the time need to set the bond will depend upon the type of container, label, and the particular adhesive formulation used.

Recycling of label bottles involves washing the article usually in an alkaline water solution (i.e. water with a base added to raise the pH above 7, typically at least about 12 or more). The water may or may not be heated and the agitation levels vary. For good removal in the variety of processes that currently exist it is important that the adhesive be highly sensitive to base. The high level of acid functionality in the adhesive provides this sensitivity.

The following examples are for purpose of illustration and not intended to limit the scope of the invention in any manner.

EXAMPLES

Example 1

An adhesive formulation (Sample 1) was prepared that comprised 12 weight % Vector 4411 (an SIS block copolymer available from Dexco with a melt index of 40), 6 weight % Quintac SL-117 (an SIS block copolymer available from Nippon Zeon with a melt index of 65), 5 weight % Hercolite 240 (aromatic hydrocarbon tackifier available from Hercules Inc. (end block resin)), 21 weight % Pripol 1013 (dimer acid available from Uniqema), 56 weight % Foral AX (a hydrogenated rosin tackifier available from Hercules Inc.) and 0.5 weight % Irganox 1010 (an antioxidant available from Ciba-Geigy Inc.)

Adhesive Sample 1 was characterized and compared to three commercially available styrenic block copolymer based pressure sensitive hot melt adhesives (Comparative Samples A, B and C). Sample A (Etm 1051), B (Etm 89e) and Sample C (Etm 128) are commercially available from National Starch and Chemical Company, Bridgewater, N.J. Viscosity was measured in Brookfield viscometer using a number 27 spindle. Each adhesive was used to attach polypropylene labels to PET bottles. The labeled sections were cut out of the bottles and sent to an independent industry test lab (United Resource Recovery Corporation (URRC), Spartanburg, SC) for determining their potential to perform in standard recycling processes. Their test involves exposing the samples to an aqueous caustic wash with some heat. The details are proprietary to the company. All of the commercial glues (ETM 1051, 89e, and 128) left adhesive residue on the PET flakes after the process. None of the adhesive from Sample 1 remained on the flakes after the process. Results are shown in Table 1.

TABLE 1

| Properties | Sample A | Sample B | Sample C | Sample 1 |
| --- | --- | --- | --- | --- |
| Viscosity @130° C. | 2300 cP | 900 cP | 1000 cP | 1500 cP |
| Initial Colour | Water white | Water white | Yellow | Pale Yellow |
| URRC Recyclability Test | fail | fail | fail | pass |

Example 2

An adhesive formulation (Sample 2) was prepared that comprised 6 weight % Vector 4114 (an SIS block copolymer available from Dexco, with a melt index of 24), 12 weight % Vector 4411 (an SIS block copolymer available from Dexco), 20 weight % Pripol 1013 (dimer acid available from Uniqema), 51.6 weight % YT 102 AX (a gum rosin tackifier available from Yser Resins), 10 weight % of Benzoflex 2088 (plasticizer), 0.2 weight % Irganox 1010 and 0.2 weight % Irganox 168 (antioxidants available from Ciba-Geigy Inc.).

Adhesive films (60 mm ×10 mm and 200 microns thick) were bonded to dry 80 mm×20 mm sections of a PET bottle provided by PETCYCLE, and then weighed. The adhesive-coated PET pieces were then washed in water containing 2.5% NaOH (caustic) at 80° C. for 8 minutes. The PET pieces were then removed, washed in neutral water, dried, and weighed. The weight % of adhesive removed from the strips is then determined gravimetrically. This lab test is designed to mimic the PETCYCLE test. PETCYCLE is a bottle recycling company in Bad Neuenahr-Ahrweiler, Germany. Adhesive removal by this lab test is shown in Table 2.

TABLE 2

| Adhesive | % Removed |
| --- | --- |
| Sample 1 | 97 |
| Sample 2 | 93 |
| Sample A | 61 |
| Sample B | 55 |
| Sample C | 49 |

Sample 2 was also submitted to PETCYCLE and was judged to remove adequately from PET bottles in their actual process.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hot melt adhesive comprising from about 10 to about 30% by weight of a styrenic block copolymer, from about 35 to about 75% by weight of an acid functional tackifier, and from about 10 to about 35% by weight of an acid functional diluent with an acid number above 100, and from about 5 to about 20% by weight of an end block resin.

2. The adhesive of claim 1 wherein the styrenic block copolymer has a melt index of >20.

3. The adhesive of claim 1 wherein the acid functional diluent is a dimer acid.

4. The adhesive of claim 1 wherein the acid functional tackifier has an acid number above 100.

5. The adhesive of claim 1 which contains a plasticizer, said plasticizer being present in amounts of up to about 20% by weight.

6. A hot melt adhesive comprising a styrenic block copolymer, an acid functional tackifier, an acid functional diluent with an acid number above 100, and an end block resin.

7. The adhesive of claim 6 wherein the styrenic block copolymer has a melt index of >20 and the acid functional tackifier has an acid number above 100.

8. The adhesive of claim 7 wherein the acid functional diluent is a dimer acid.

9. The adhesive of claim 6 where the acid functional diluent is a dimer acid.

10. The adhesive of claim 6 wherein the endblock resin is alpha methyl styrene.

11. The adhesive of claim 6 which contains a mixture of styrenic block copolymers.

12. The adhesive of claim 6 which contains styrenic block copolymers selected from the group consisting of polystyrene-polybutadiene-polystyrene (SBS), polystyrene-polyisoprene-polystyrene (SIS) and e.g., polystyrene-poly-(ethylenebutylene)-polystyrene (SEBS), polystyrene-poly-(ethylenepropylene-polystyrene (SEPS) and mixtures thereof.

13. The adhesive of claim 1 which contains a mixture of styrenic block copolymers.

14. The adhesive of claim 1 which contains styrenic block copolymers selected from the group consisting of polystyrene-polybutadiene-polystyrene (SBS), polystyrene-polyisoprene-polystyrene (SIS) and e.g., polystyrene-poly-(ethylenebutylene)-polystyrene (SEBS), polystyrene-poly-(ethylenepropylene)-polystyrene (SEPS) and mixtures thereof.

* * * * *